(12) United States Patent
Matsunaga

(10) Patent No.: US 8,571,793 B2
(45) Date of Patent: Oct. 29, 2013

(54) MAP DATA, METHOD FOR PREPARING THE SAME, DATA PRODUCT CONTAINING THE SAME, STORAGE MEDIUM CONTAINING THE SAME, AND NAVIGATION APPARATUS USING THE SAME

(75) Inventor: Takayuki Matsunaga, Hachioji (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 13/279,435

(22) Filed: Oct. 24, 2011

(65) Prior Publication Data

US 2012/0084002 A1 Apr. 5, 2012

Related U.S. Application Data

(63) Continuation-in-part of application No. 13/013,911, filed on Jan. 26, 2011.

(30) Foreign Application Priority Data

Jan. 29, 2010 (JP) .................................. 2010-19098
Oct. 26, 2010 (JP) .................................. 2010-240036

(51) Int. Cl.
*G01C 21/26* (2006.01)
*G01C 21/32* (2006.01)
*G09B 29/00* (2006.01)

(52) U.S. Cl.
USPC ....... 701/461; 340/995.18; 701/532; 701/540

(58) Field of Classification Search
USPC ......................................................... 701/201
See application file for complete search history.

(56) References Cited

U.S. PATENT DOCUMENTS

| 5,928,305 | A | * | 7/1999 | Nomura | ......................... 701/532 |
| 5,951,622 | A | * | 9/1999 | Nomura | ......................... 701/533 |
| 6,058,350 | A | * | 5/2000 | Ihara | ............................... 701/93 |
| 6,128,573 | A | * | 10/2000 | Nomura | ......................... 701/428 |

(Continued)

FOREIGN PATENT DOCUMENTS

| JP | 09180089 A | * | 7/1997 |
| JP | A-2008-164732 | | 7/2008 |

OTHER PUBLICATIONS

The first Chinese Office Action dated Aug. 3, 2012 issued from the Chinese Patent Office for the corresponding Chinese patent application No. 201110036961.4 (with English translation).

(Continued)

*Primary Examiner* — Shelley Chen
(74) *Attorney, Agent, or Firm* — Posz Law Group, PLC

(57) ABSTRACT

Map data define a road in units of links, and a multilink as links connected consecutively with an identical attribute while containing: a road management information list storing fixed-length road management information elements, each indicating the number of links in each multilink; a lower level link information list storing fixed-length link information elements, each indicating the number of coordinate points in each link, in an order in which corresponding road management information elements are arrayed in the road management information list; a higher level link information list storing fixed-length link information elements, each indicating a multilink as a higher level link; and a higher level link ID list storing fixed-length information elements, each indicating a storage array position in the higher level link information list with respect to a multilink, in an order in which corresponding lower link information elements are arrayed in the lower level link information list.

6 Claims, 13 Drawing Sheets

(56) References Cited

U.S. PATENT DOCUMENTS

| | | | |
|---|---|---|---|
| 6,427,116 B2* | 7/2002 | Inoue et al. | 701/410 |
| 6,462,676 B1* | 10/2002 | Koizumi | 340/995.1 |
| 7,526,492 B2* | 4/2009 | Mikuriya et al. | 701/454 |
| 2001/0019558 A1* | 9/2001 | Suzuki et al. | 370/465 |
| 2001/0056325 A1* | 12/2001 | Pu et al. | 701/202 |
| 2002/0004701 A1* | 1/2002 | Nakano | 701/200 |
| 2002/0026281 A1 | 2/2002 | Shibata et al. | |
| 2003/0132862 A1* | 7/2003 | Kurosawa | 340/995.1 |
| 2003/0191579 A1* | 10/2003 | Sakamoto et al. | 701/202 |
| 2004/0249568 A1* | 12/2004 | Endo et al. | 701/209 |
| 2005/0143914 A1 | 6/2005 | Yamada et al. | |
| 2005/0203937 A1* | 9/2005 | Nomura | 707/102 |
| 2005/0209773 A1* | 9/2005 | Hara | 701/201 |
| 2005/0228584 A1* | 10/2005 | Adachi et al. | 701/208 |
| 2006/0155462 A1* | 7/2006 | Sumizawa et al. | 701/208 |
| 2006/0155463 A1* | 7/2006 | Adachi | 701/208 |
| 2007/0185649 A1* | 8/2007 | Geilich | 701/208 |
| 2007/0266055 A1* | 11/2007 | Nomura | 707/200 |
| 2008/0091344 A1 | 4/2008 | Mikuriya et al. | |
| 2009/0177706 A1 | 7/2009 | Takahata et al. | |
| 2009/0240426 A1* | 9/2009 | Akita et al. | 701/201 |
| 2010/0023554 A1* | 1/2010 | Fujimoto et al. | 707/104.1 |
| 2010/0274469 A1 | 10/2010 | Takahata et al. | |
| 2011/0191016 A1* | 8/2011 | Nomura et al. | 701/200 |
| 2011/0191357 A1* | 8/2011 | Tanaka et al. | 707/752 |
| 2011/0307648 A1 | 12/2011 | Nomura | |

OTHER PUBLICATIONS

Hidetoshi Fujimoto, "World Wide Vehicle Navigation System Using KIWI Format," *DENSO Technical Review*, vol. 6, No. 1, 2001, pp. 29-34.

The second Chinese Office Action dated Feb. 25, 2013 issued from the Chinese Patent Office for the corresponding Chinese patent application No. 201110036961.4 (with English translation).

Office Action mailed Aug. 6, 2013 in corresponding JP patent application No. 2010-019098 (and English translation).

* cited by examiner

FIG. 2

INTEGRATED FILE

| Lev0 INTEGRATE MESH DATA NUMBER |
| --- |
| ... |
| Lev5 INTEGRATE MESH DATA NUMBER |
| Lev0 INTEGRATE MESH OFFSET 1 |
| ... |
| Lev5 INTEGRATE MESH OFFSET n |
| Lev0 INTEGRATE MESH DATA 1 |
| ... |
| Lev5 INTEGRATE MESH DATA n |

INTEGRATE MESH DATA

| INTEGRATE MESH DATA SIZE |
| --- |
| MESH NUMBER |
| MESH UNIT DATA OFFSET 1 |
| ... |
| MESH UNIT DATA OFFSET n |
| MESH UNIT DATA 1 |
| ... |
| MESH UNIT DATA n |

MESH UNIT DATA

| MESH UNIT HEADER |
| --- |
| ROAD MANAGE INFO 1 |
| ... |
| ROAD MANAGE INFO n |
| LINK INFO 1 |
| ... |
| LINK INFO n |
| COORDINATE INFO 1 |
| ... |
| COORDINATE INFO n |
| STREET NAME ID 1 |
| ... |
| STREET NAME ID n |
| ROAD NUMBER NAME ID 1 |
| ... |
| ROAD NUMBER NAME ID n |
| NAME DIC DATA 1 |
| ... |
| NAME DIC DATA n |
| AREA CODE 1 |
| ... |
| AREA CODE n |
| ADDRESS RANGE INFO 1 |
| ... |
| ADDRESS RANGE INFO n |
| REP COORDINATE INFO 1 |
| ... |
| REP COORDINATE INFO n |
| HIGH LEVEL LINK ID 1 |
| ... |
| HIGH LEVEL LINK ID n |
| BOUNDARY NODE NUMBER 1 |
| ... |
| BOUNDARY NODE NUMBER n |
| COMPOSITE LINK RE RECORD 1 |
| ... |
| COMPOSITE LINK RE RECORD n |

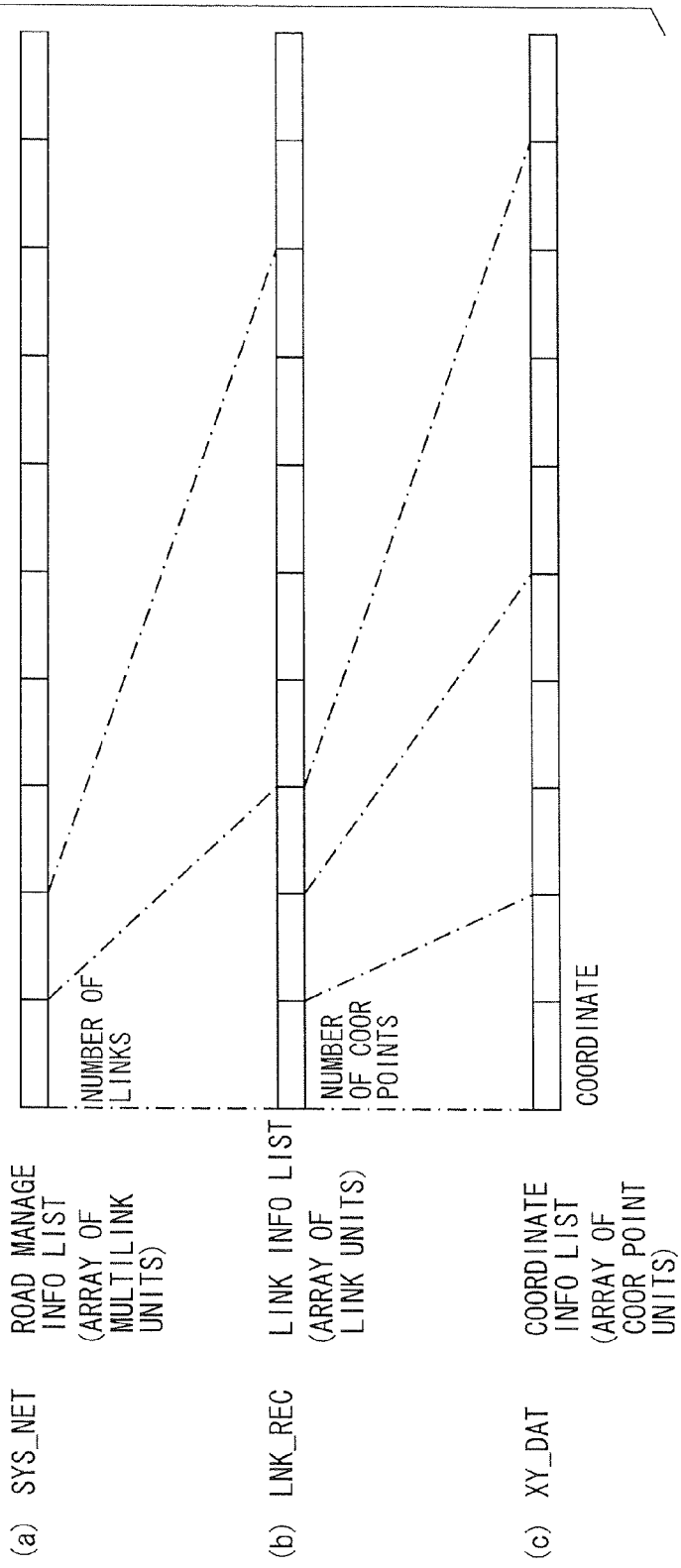

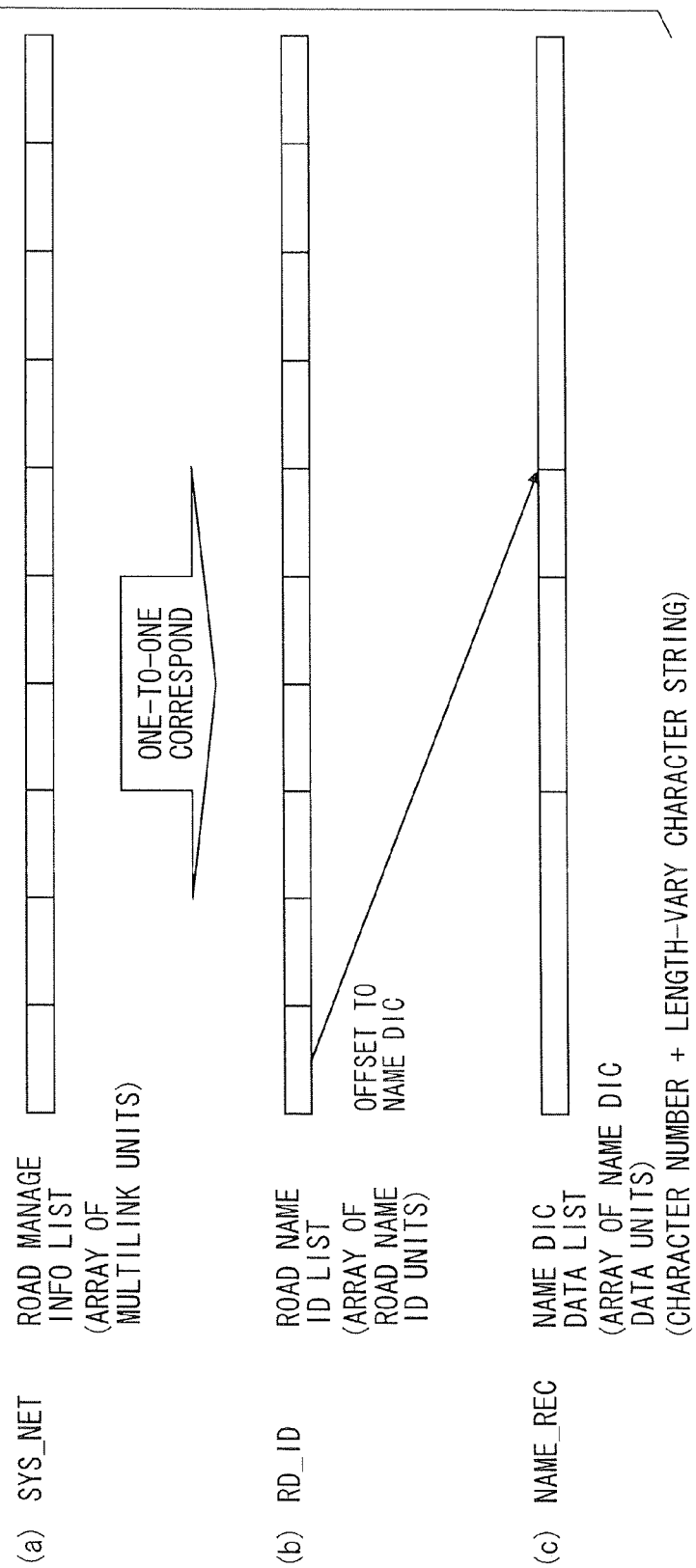

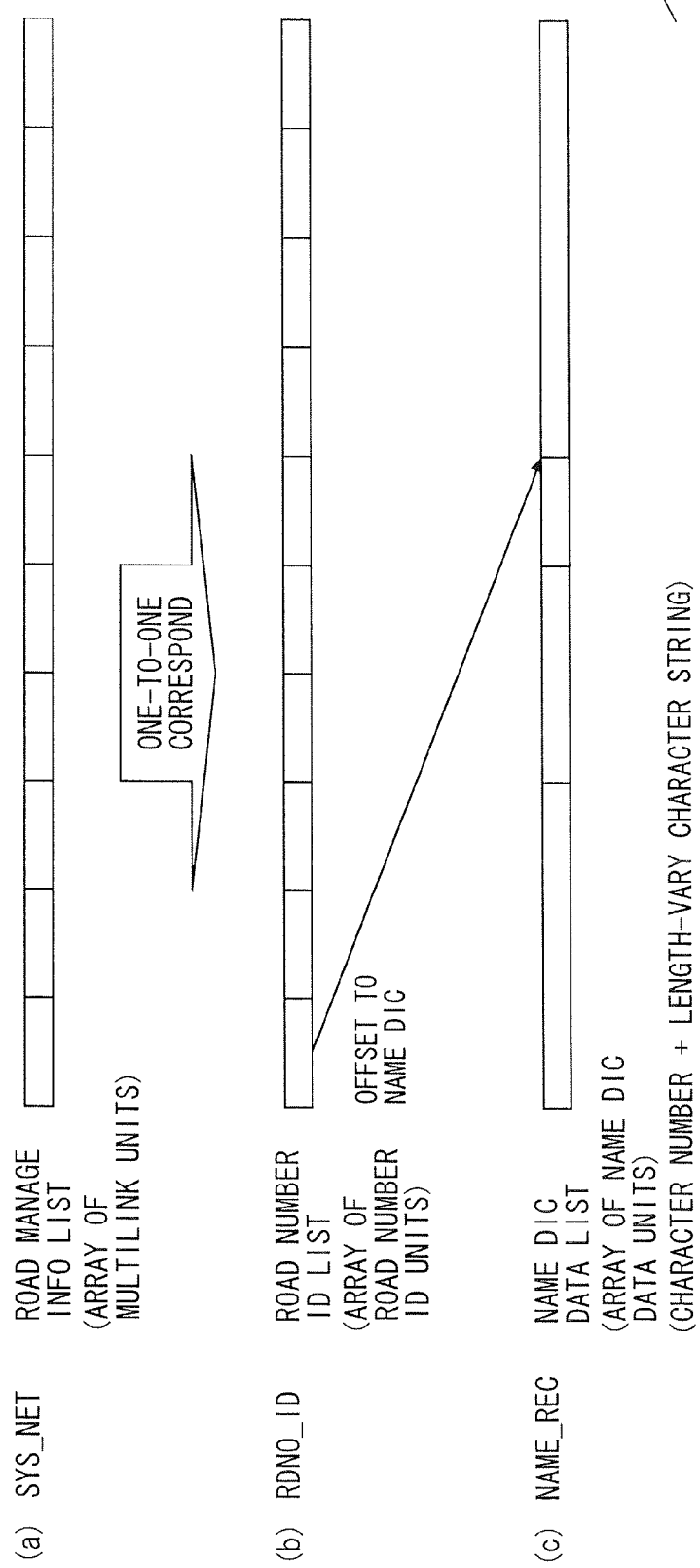

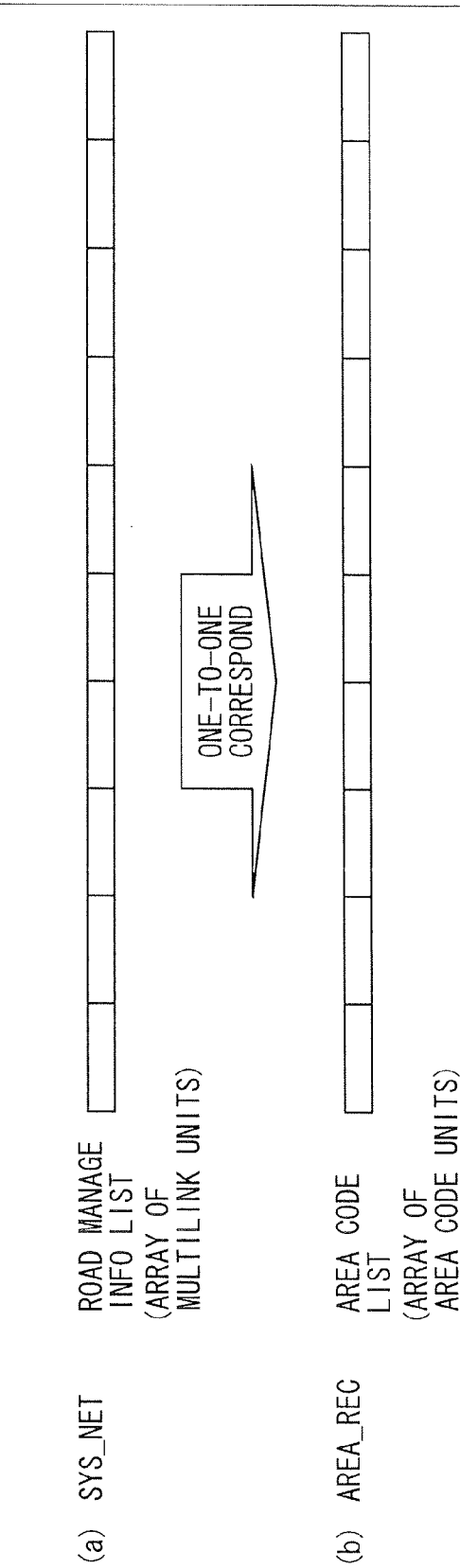

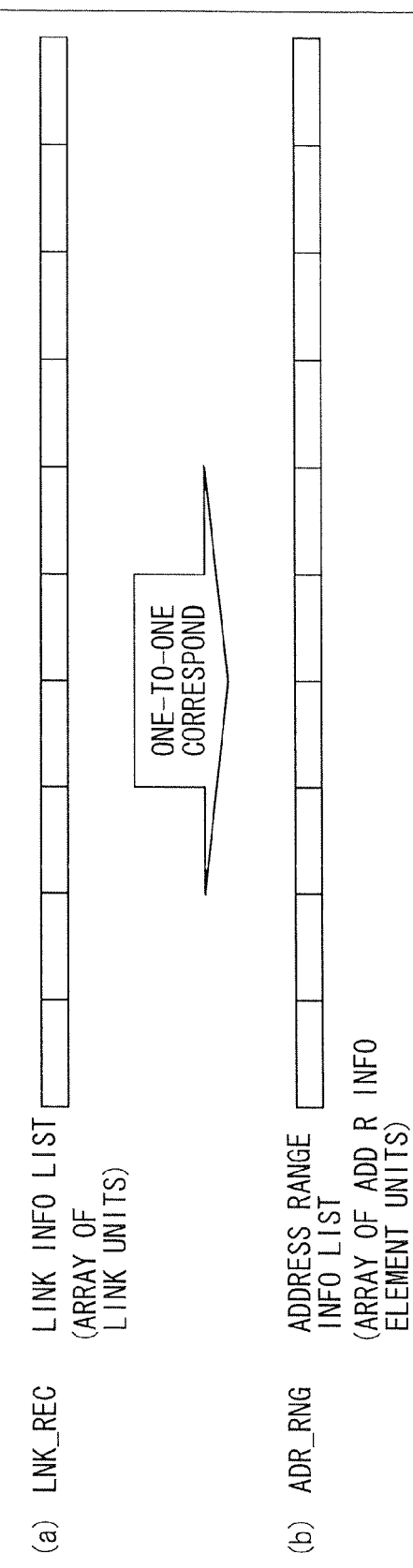

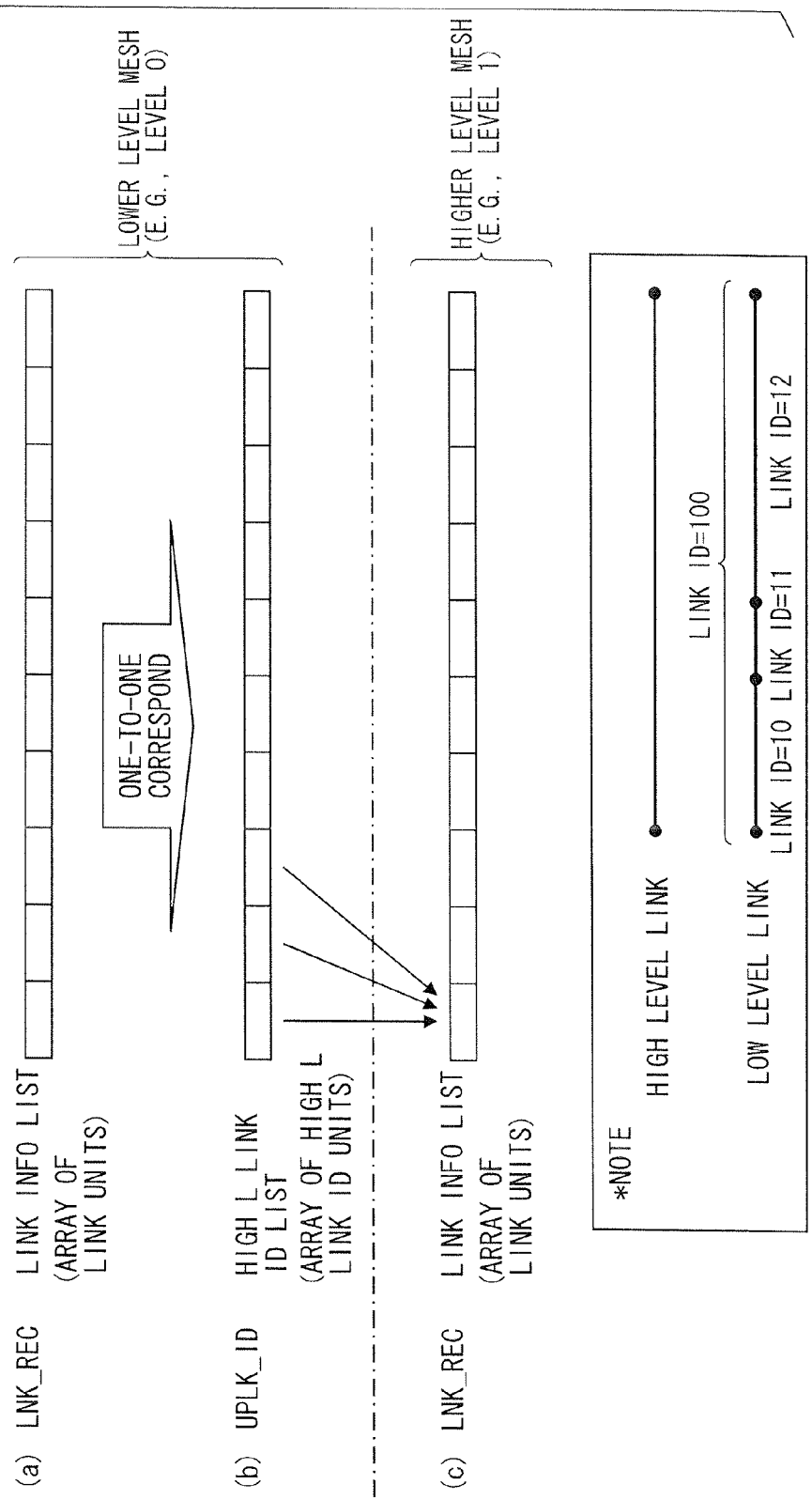
FIG. 8 ACQUISITION OF HIGHER LEVEL LINK ID

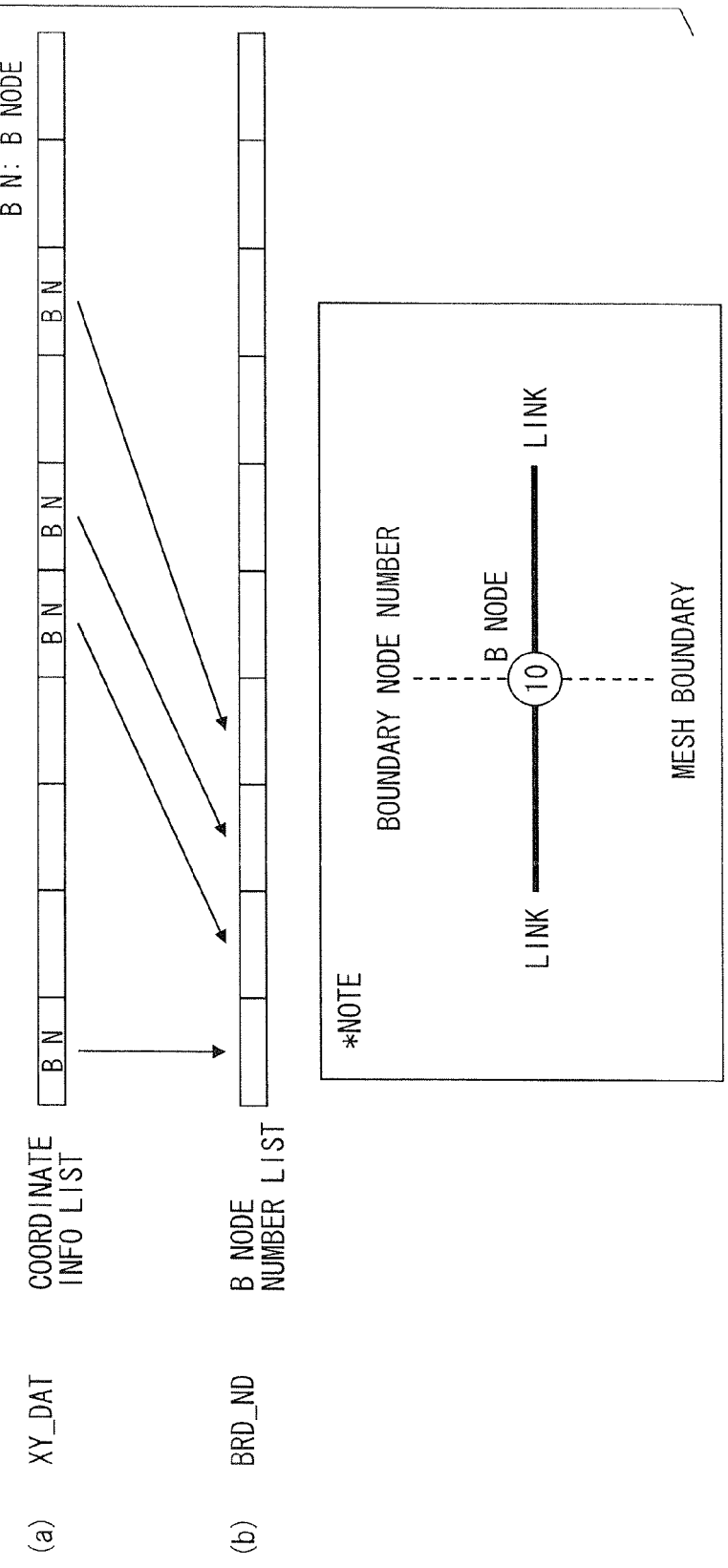

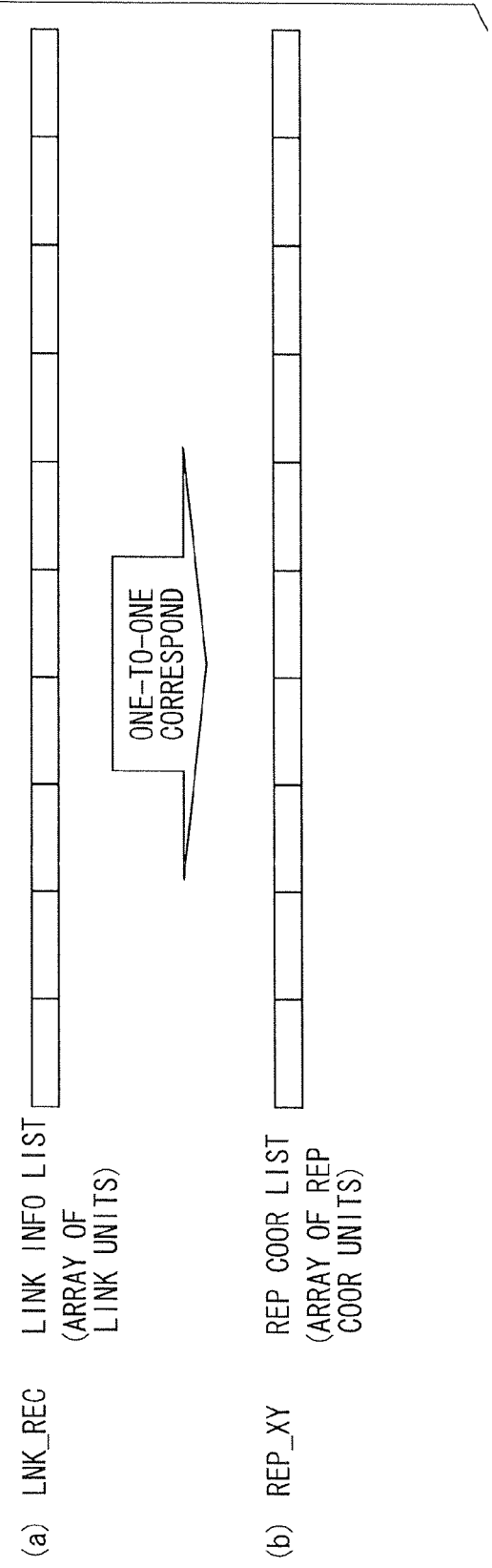

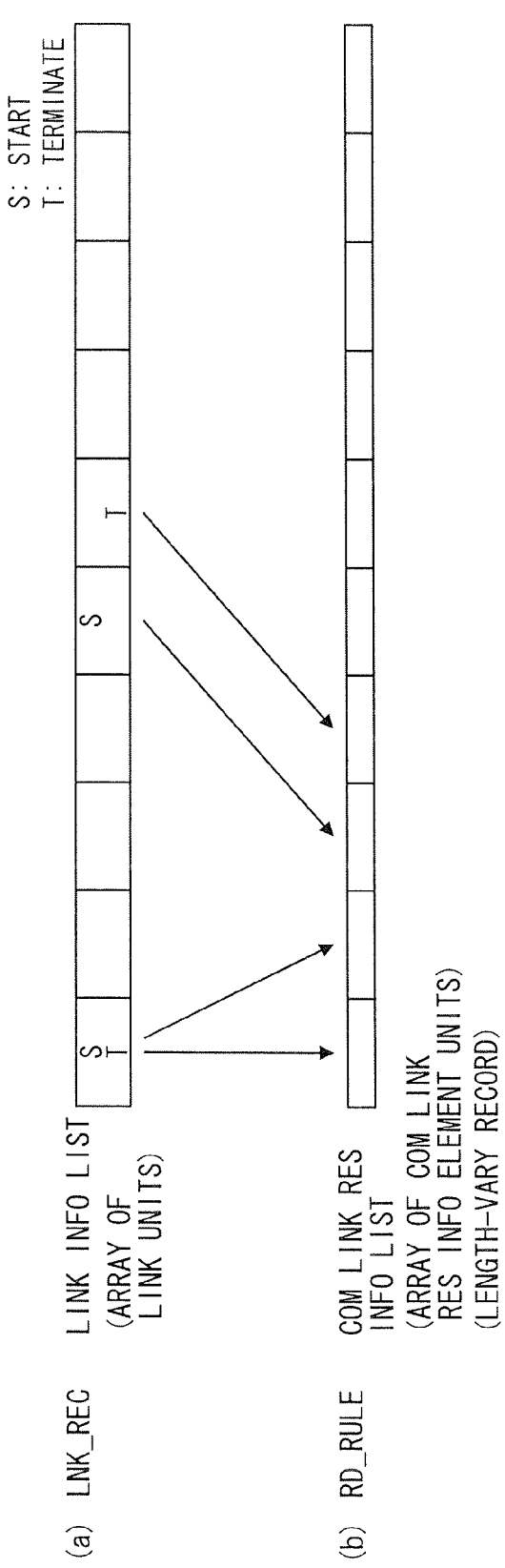

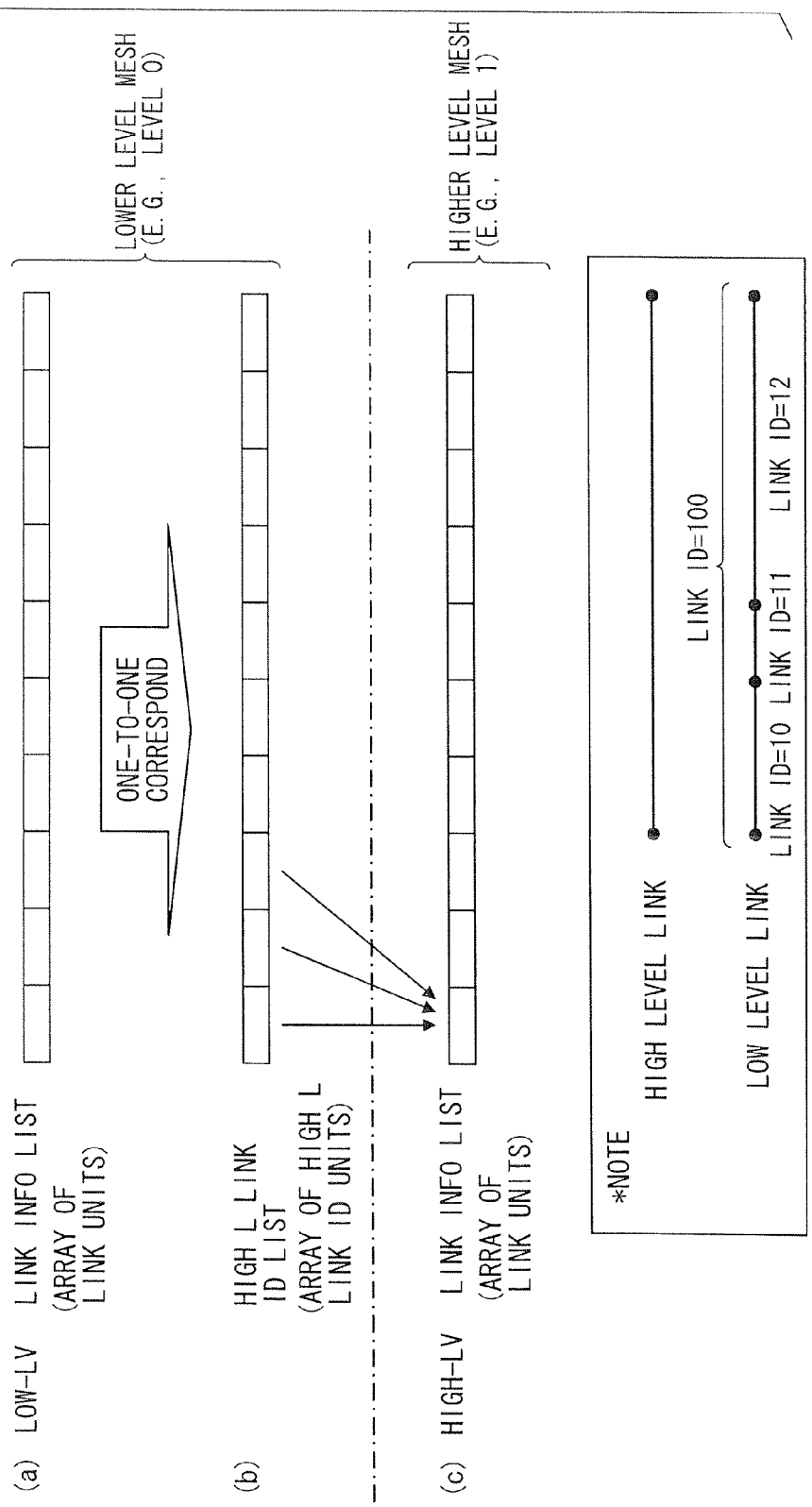

MAP DATA, METHOD FOR PREPARING THE SAME, DATA PRODUCT CONTAINING THE SAME, STORAGE MEDIUM CONTAINING THE SAME, AND NAVIGATION APPARATUS USING THE SAME

CROSS REFERENCE TO RELATED APPLICATION

The present application is a continuation-in-part from U.S. patent application Ser. No. 13/013,911 and related to Japanese Patent Application No. 2010-19098 filed on Jan. 29, 2010 and Japanese Patent Application No. 2010-240036 filed on Oct. 26, 2010, the contents of which are incorporated herein by reference.

FIELD OF THE INVENTION

The present invention relates to map data, a method for preparing the same, a storage medium containing the same, and a navigation apparatus using the same.

BACKGROUND OF THE INVENTION

[Nonpatent document 1] DENSO Technical Review VOL. 6 NO. 1 2001 P 29-34

In Japan, there is generally used a navigation apparatus-use map data format, which is called the KIWI/A format (for example, refer to Nonpatent document 1). In this format, a road on a map is represented in units of links; each link has reference information of a starting node and a terminating node. In addition, the map data based on this format is stratified hierarchically into several layers (i.e., levels) to improve a speed in route retrieval. The lowest layer is provided with links, each of which is assigned with a link ID for identification. In particular, for the purpose of enhancing an efficiency in drawing of roads having an identical attribute and reducing a data volume, the group of the links, which have the identical attribute and are connected serially, is stipulated as a multilink (also referred to as a link string), and links constituting the multilink are assigned with link IDs having consecutive values. Thereby, when expressing the multilink in a higher level layer, the link IDs of the starting end and terminating end of the multilink are used to identify the links within the multilink.

The map format, which is generally used such as the format of the above-mentioned KIWI/A format, is prepared by dividing into route retrieval data and map drawing data so as to provide suitable formats to applications which uses the two data, respectively. This further raises access speeds to the data and provides a system with short processing time.

In this regard, however, preparing the KIWI/A format having the two divided data groups of the route retrieval data and the map drawing data results in necessity of doubly having the identical data (for example, road information etc.), posing a disadvantage to increase the volume of the map data. In addition, the route retrieval data and map drawing data have division sizes (i.e., a parcel versus a region) different from each other for the optimization. This also poses a disadvantage to need to take time and effort in addition and deletion.

Furthermore, when a route retrieval is made using the map data based on the above format, the connection from a lower level layer to a higher level layer is made by node information (higher level connection node). For instance, suppose a route retrieval that is made from a link of a higher level like in a case where a road also existing in a higher level layer such as a notional road is selected as a starting point or a destination. In this route retrieval, a route calculation process is first made in links of a lower level layer; then, a higher level connection node is found to thereby enable the transfer from the lower level layer to the higher level layer.

However, in the route retrieval using the map data based on the above format, the reciprocal transfers between the higher level layer and the lower level layer are necessary when the route retrieval is made from a higher level layer. This needs a time in processing of the route retrieval, posing a problem. In addition, finding the higher level connection node also needs a time.

SUMMARY OF THE INVENTION

The present invention is made in consideration of such a problem. It is an object of the present invention to provide navigation-use map data that enables a high speed route calculation. Further, a method for preparing the map data, a non-transitory computer readable storage medium containing the map data, and a navigation apparatus using the map data are provided.

To achieve the above object, according to a first example of the present invention, map data is provided as follows. In the map data, a road is presented in units of links and a multilink (i.e., a link string) is defined as a plurality of links, which have an identical attribute and are consecutively arranged in an order in the multilink. The map data includes a multilink information list, a lower level link information list, a higher level link information list, and a higher level link offset information list. The multilink information list stores a plurality of multilink information elements in a plurality of predetermined fixed lengths, one multilink information element indicating a number of links arranged within one multilink, wherein the plurality of multilink information elements are arrayed in the multilink information list in an order that is defined as a multilink list storage order. The lower level link information list stores a plurality of lower link information elements in a plurality of predetermined fixed lengths, one lower level link information element indicating a number of coordinate points arranged within one link to illustrate a shape of the one link, wherein the plurality of lower level link information elements are arrayed in the lower level link information list in an order that is defined as a link list storage order. Herein, under the link list storage order, (i) a plurality of lower level link information elements are respectively corresponded to by a plurality of links arranged in one multilink, the plurality of lower level link information elements being arrayed in an order in which the corresponding links are consecutively arranged in the one multilink, wherein the plurality of lower level link information elements with respect to the one multilink are respectively corresponded to by a multilink information element and defined as a link information element group with respect to one multilink, and (ii) a plurality of link information element groups are respectively corresponded to by a plurality of multilink link information elements, the plurality of link information element groups being arrayed in an order in which the corresponding multilink information elements are arrayed in the multilink information list. The higher level link information list stores a plurality of higher level link information elements in a plurality of predetermined fixed lengths, one higher level link information element indicating a multilink as a higher level link, wherein the plurality of higher level link information elements are arrayed in the higher level link information list in an order that is defined as a higher level link list storage order. The higher level link offset information list stores, in a plurality of predetermined data lengths, a plurality of offset information items each of which indicates a storage array position in the higher level list information list with respect to a higher level link corresponding to a plurality of links, which are corresponded to by lower level link information elements. Herein, the plurality of offset information items are arrayed in the higher level link offset information list in an order in which the corresponding lower level link information elements are arrayed in the lower level link information list.

As a second example of the present invention, a method for preparing map data used in a navigation apparatus in a vehicle is provided as follows. The method comprises preparing, of the map data of the above first example, the multilink information list, the lower level link information list, the higher level link information list, and the higher level link offset information list.

As a third example of the present invention, a data product stored in a non-transitory computer-readable storage medium is provided as storing the map data according to the above first example.

As a fourth example of the present invention, a non-transitory computer-readable storage medium is provided as storing the map data prepared by the method according to the above second example.

As a fifth example of the present invention, a navigation apparatus in a vehicle is provided as follows. A map data storage device is included to store the map data prepared by the method according to the above second example. A position detection device is included to detect a present position of the vehicle. An input device is included to receive an instruction input by the user. A notification device is included to notify a user in the vehicle of navigational information. A control circuit is included to retrieve a guide route based on a present position detected by the present position and a destination designated by an instruction input via the input device.

Under the above configuration, the higher level link information list (i.e., the link information of a higher level road network) is provided as corresponding to the lower level link information list (i.e., the link information of a lower level road network; thus, the link of the higher level layer and the link of the lower level layer are associated with each other using the offset information.

In the route retrieval using the above map data, a route calculation can be made in the road network of the higher level layer based on the link numbers of the road network of the higher level layer. That is, there is no need of reciprocal transfers between the higher level layer and the lower level layer when the route retrieval is made from the link of the higher level layer; thereby, the route calculation can be made within the higher level layer. Needless to say, there is no need to find a higher level connection node like in the case of using a conventional map data. That is, unlike a conventional map data, the above map data has a configuration that does not include any connection node. Thus, a high speed route retrieval can be achieved.

As an optional aspect, a coordinate information list may be provided which stores a plurality of coordinate information items in a plurality of predetermined data lengths, one coordinate information item indicating a coordinate of a coordinate point arranged in one link to illustrate the shape of the one link, wherein the plurality of coordinate information items are corresponded to by a plurality of coordinate points contained in the one link. The plurality of coordinate information items are arrayed in the coordinate information list in an order in which the corresponding coordinate points are arranged in the one link.

Under such a configuration, a high speed map drawing can be made.

BRIEF DESCRIPTION OF THE DRAWINGS

The above and other objects, features, and advantages of the present invention will become more apparent from the following detailed description made with reference to the accompanying drawings. In the drawings:

FIG. 2 is a diagram for explaining a basic data structure of the map data according to the embodiment;

FIG. 3 is a diagram for explaining an example of acquiring road management information, link information, and road shape information;

FIG. 4 is a diagram for explaining an example of acquiring a road name;

FIG. 5 is a diagram for explaining an example of acquiring a road number;

FIG. 6 is a diagram for explaining an example of acquiring an area code;

FIG. 7 is a diagram for explaining an example of acquiring address range information;

FIG. 8 is a diagram for explaining an example of acquiring a higher level link ID;

FIG. 9 is a diagram for explaining an example of acquiring boundary node information;

FIG. 10 is a diagram for explaining an example of acquiring representative coordinate information;

FIG. 11 is a diagram for explaining an example of acquiring composite link restriction information; and FIG. 12 is a diagram for explaining an example of acquiring a higher level link ID using a lower level link information list, a higher level link ID list, and a higher level link information list.

DETAILED DESCRIPTION OF THE PREFERRED EMBODIMENTS

Embodiments according to the present invention will be explained with reference to drawings.

First Embodiment

Figure 1A:
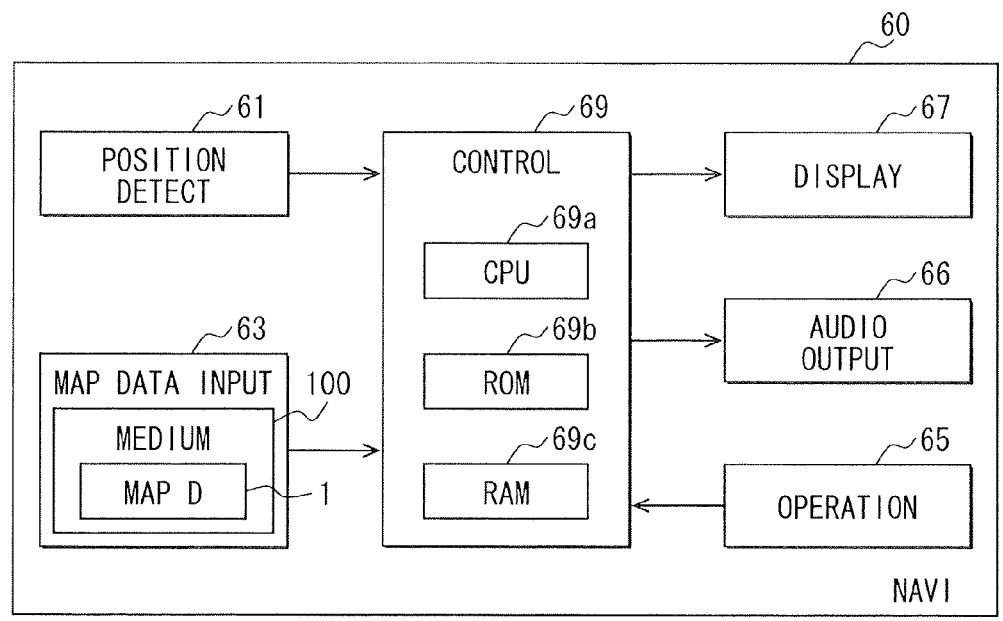
FIG. 1A is a diagram illustrating a schematic configuration of a navigation apparatus and a map data storage medium according to an embodiment of the present invention.

FIG. 1A illustrates a navigation apparatus 60 mounted in a subject vehicle. The navigation apparatus 60 provides a user of the subject vehicle with a navigational guidance using map data 1 stored in a non-transitory computer-readable storage medium 100 according to an embodiment of the present invention. The navigation apparatus 60 includes the following: a position detection device 61 to detect a present position of the vehicle using a well-known method such as a GPS receiver to receive GPS signals from GPS satellites; a display device 67 functioning as an example of a notification device to display information; an audio output device 66 also functioning as an example of a notification device to output a sound such as a navigational guidance sound; an operation device 65 functioning as an example of an input device for a user to enter various kinds of instruction inputs; a map data input device 63 to accept the map data storage medium 100 and read map data from the storage medium 100; and a control circuit 69 being a well-known microcomputer having a CPU 69a, a ROM 69b, and a RAM 69c. The control circuit 69 executes, as one of a variety of processes, a navigational guidance process including a route retrieval process and a map drawing process. That is, the control circuit 69 retrieves a guidance route from a present position detected by the position detection device 61 to a destination designated by the user via the operation device 65 based on the map data 1 and various input signals from the foregoing devices. The control circuit 69 further displays the retrieved guidance route in the display device 67 along with a map surrounding the present position while outputting a guidance audio along the guidance route via the audio output device 66.

1. Outline of Map Data 1

Figure 1B:
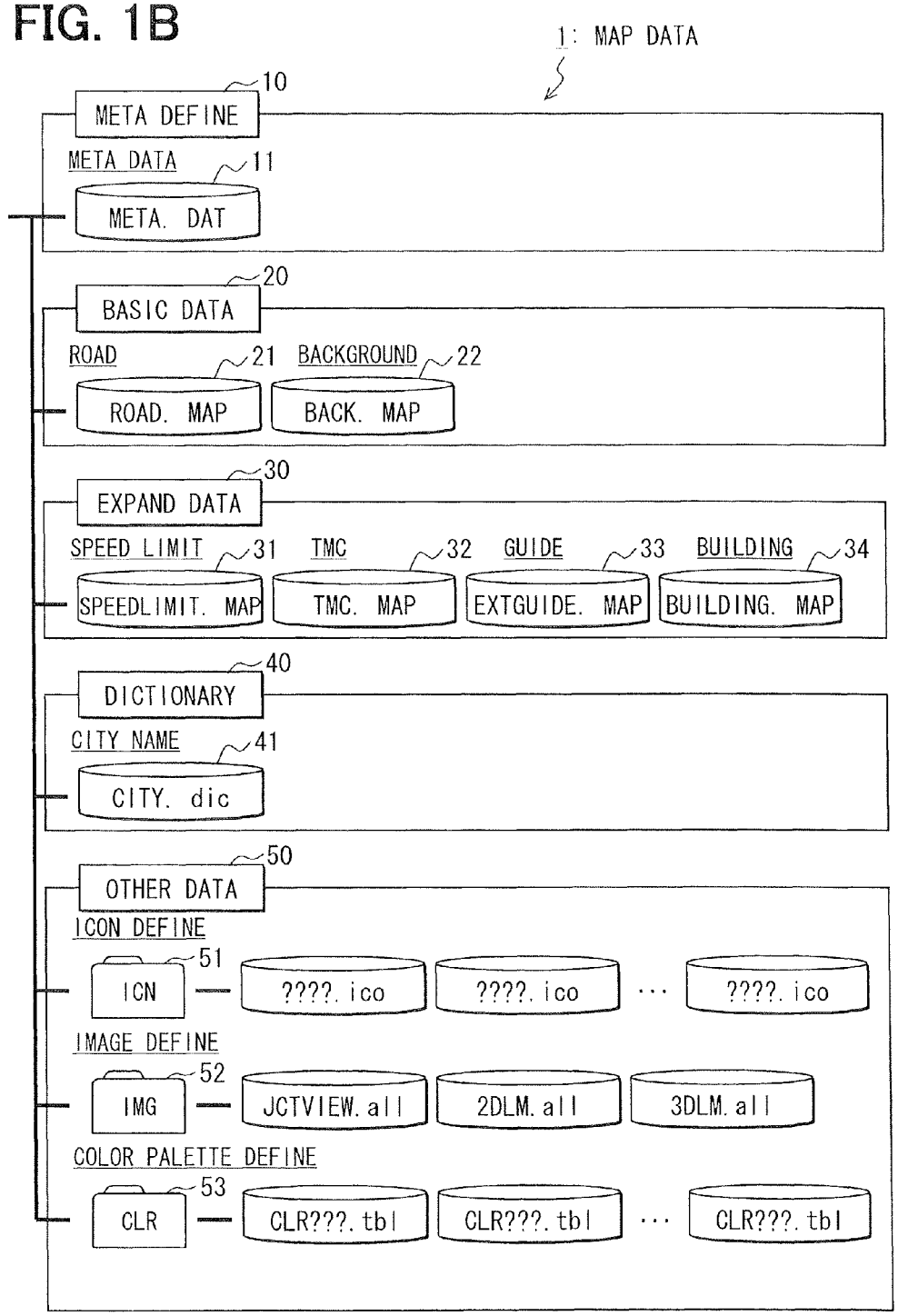
FIG. 1B is a diagram for explaining a basic data structure of map data according to the embodiment.

With reference to FIG. 1B and FIG. 2, an outline of the map data 1 according to the present embodiment is explained. FIG. 1B and FIG. 2 are diagrams for explaining a basic data structure of the map data 1.

The map data 1 according to the present embodiment has the following features.

(1) File Structure

The map data 1 according to the present embodiment stores or contains several kinds of files such as meta-definition data 10, basic data 20, expansion data 30, dictionary data 40, and auxiliary data 50. Further, the meta-definition data 10 contains metadata 11. The basic data 20 contains road data 21 and background data 22. The expansion data 30 contains speed limit information 31, TMC (Traffic Message Channel) information 32, guidance and lane information 33, and building form and landmark information 34. The dictionary data 40 contains a city name dictionary 41. The other data 50 contains icon definition 51, image definition 52, color palette definition 53.

The metadata 11 stores configuration information of record data. In addition, the road data 21 stores information on road network. The background data 22 stores information on background (planes, lines, points). In addition, the speed limit information 31 stores information on speed limit. The TMC information 32 stores information on TMC. The guidance and lane information 33 stores information on guidance and information on lane. The building form and landmark information 34 stores information on building form and information on landmark. In addition, the city name dictionary 41 stores information on city name in a dictionary format. In addition, the icon definition 51 stores information on icon. The image definition 52 stores information on image. The color palette definition 53 stores information on color palette.

(2) Mesh Structure

The map data 1 is generated and recorded with respect to each of classified levels of detail from level 0 to level 5. In this case, level-specific mesh data, which is referred to as an integrated mesh data unit relative to a specific level, is prepared by integrating the predetermined number of reference meshes with respect to each of the levels. It is noted that the map data of the level 5 stores data of a widest area (i.e., largest area) while the map data of the level 0 stores data of a narrowest area (i.e., most detailed area or smallest area).

(3) Integrated File Structure

In the map data 1, the files classified into the above-mentioned basic data 20 or expansion data 30 are prepared in integrated file units, each of which is generated by integrating integrated mesh files. As mentioned above, the basic data 20 contains road data 21 and background data 22; the expansion data 30 contains speed limit information 31, TMC information 32, guidance and lane information 33, and building form and landmark information 34.

As illustrated in FIG. 2, the above-mentioned integrated file contains: a list (i.e., an integrated mesh data number list) that contains each number of integrated mesh data relative to each of the several levels; a list (i.e., an integrated mesh offset list) that contains each integrated mesh offset relative to each of the several levels; and a list (i.e., an integrated mesh data list) that contains each integrated mesh data relative to each of the several levels. The number of integrated mesh data is stored as a numeral quantity of the number of integrated mesh data; it has the data size of four (4) bytes. Therefore, the data size of the integrated mesh data list pertinent to six numeral quantities of integrated mesh data becomes 24 bytes. The integrated mesh offset is stored as a numeral quantity of the offset (relative position in bytes) to the corresponding integrated mesh data; it has the data size of four (4) bytes. When any integrated mesh data of a certain level is not present, the null value (0xFFFFFFFF) is stored. Therefore, the data size of the integrated mesh offset list pertinent to six numeral quantities of integrated mesh offsets becomes 24 bytes.

In addition, the integrated mesh data includes a data size of integrated mesh, the number of meshes, a mesh-unit data offset list, and a mesh-unit data list. The data size of integrated mesh data is stored as the total size of the integrated mesh data by using four (4) bytes. In addition, the number of the meshes is stored as a numeral quantity of the number of meshes contained in a map region corresponding to the integrated mesh data by using two (2) bytes. In addition, the mesh-unit data offset is stored as a numeral quantity of an offset (byte position) from a top integrated mesh data offset of the present level to the mesh-unit data corresponding to the present mesh. When any mesh-unit data of the present mesh is not present, the null value (0xFFFFFFFF) is stored.

The mesh-unit data contains different types of contents depending on various kinds of data. The following explains, as one kind, road data 21 related to the present embodiment of the present invention while the detailed explanation is omitted with respect to the other kinds of data.

(4) Road Data 21

With reference to FIG. 2, explanation is made with respect to the case when the above-mentioned integrated file is the road data 21. The mesh-unit data in the integrated mesh data included in the integrated file contain the following: a mesh-unit header, a road management information list, a link information list, a coordinate information list, a street name ID list (road name ID list), a road number name ID list, name dictionary data (city name dictionary), an area code list, an address range information list, a representative coordinate information list, a higher level link ID list, a boundary node number list, and a composite link restriction record list.

In the mesh-unit header, each record number with respect to each of various lists such as a road management information list included in the mesh-unit data is registered in each information element in each data field. Each information element or each data field contained in the mesh-unit header has a fixed data length; therefore, the mesh-unit header has also a fixed data length.

As explained above, a multilink, which is also referred to as a link string, is defined as containing a group of links. Such links have an identical attribute (e.g., road name) while being physically and continuously connected to each other and arranged within the corresponding multilink consecutively in an order, which is referred to as a link arrangement order. Further, such links constituting one multilink may be assigned with link IDs having serial values. Furthermore, within one link, one or more interpolating shape points, if any, may be arranged within and along a corresponding link in an order, which is referred to as a shape point arrangement order, and defined so as to indicate a shape of the corresponding link using their coordinates. The shape point may be also referred to as a coordinate point, while the shape point arrangement order may be also referred to a coordinate point arrangement order.

On the basis of the foregoing relations among a multilink, links of the multilink, and coordinate points of each of the links, the following explanation can be made with respect to a road management information list, a link information list, and a coordinate information list.

Further, the links constituting one multilink may be referred to as a multilink-constituting link group; and the coordinate points constituting one link may be referred to as a link-constituting coordinate point group.

Now, with reference to FIG. 3 (a), (b), (c), each of three lists contains several data fields (e.g., ten data fields are illustrated in each list); each of the several data fields has a predetermined fixed length while containing or recording one information element.

First, with reference to FIG. 3 (a), the road management information list stores in array, in a plurality of predetermined fixed length data fields, several road management information elements. Each road management information element indicates the number of links contained in one multilink. The several road management information elements are arrayed in a storage order, which is referred to as a multilink list storage order. Thus, the road management information list relates to several multilinks and is configured with respect to each of a unit of a multilink; in other words, each data field or information element corresponds to one multilink. Further, the road management information list may be also referred to as a multilink information list with respect to several multilinks.

Second, with reference to FIG. 3 (b), the link information list stores in array, in a plurality of predetermined fixed length data fields, several link information elements. Each link information element indicates the number of coordinate points, which are contained or arranged in one link in order to illustrate a shape of the one link. The number of coordinate points in the one link may be zero, one, or more than one. The several link information elements are arrayed in a storage order, which is referred to as a link list storage order. Thus, the link information list is configured with respect to each of a unit of a link; in other words, each data field or information element corresponds to one link.

Under the Above Link List Storage Order, (i) several link information elements, which are, respectively, corresponded to by several links contained in one multilink, are arrayed in an order in which the corresponding links are arranged within the one multilink (i.e., in the link arrangement order within the one multilink), wherein the foregoing several link information elements relative to the one multilink are defined as a link information element group with respect to one multilink, and (ii) several link information element groups, which are, respectively, corresponded to by several multilink information elements, are arrayed in an order in which the corresponding multilink information elements are arranged in the road management information list.

Third, with reference to FIG. 3 (c), the coordinate information list stores in array, in a plurality of predetermined fixed length data fields, several coordinate information elements. Each coordinate information element indicates coordinate information (e.g., a coordinate) of one coordinate point. The several coordinate information elements are arranged in a storage order, which is referred to as a coordinate list storage order. Thus, the coordinate information list is configured with respect to each of a unit of a coordinate point; in other words, each data field or information element corresponds to one coordinate point.

Under the Above Coordinate List Storage Order, (i) several coordinates, which are respectively corresponded to by coordinate points, which are contained or arranged consecutively in one link, are arrayed in an order in which the corresponding coordinate points are arranged within the one link (i.e., in the coordinate point arrangement order within the one link), wherein the foregoing coordinates of coordinate points contained in one link are defined as a coordinate information element sub-group with respect to one link, (ii) several coordinate information element sub-groups, which are respectively corresponded to by several link information elements with respect to one multilink, are arranged in an order in which the corresponding link information elements are arrayed in the link information list (i.e., in the link arrangement order), wherein the foregoing coordinates contained or arranged consecutively in one multilink are defined as a coordinate information element group with respect to one multilink; and (iii) several coordinate information element groups, which are respectively corresponded to by several multilink information elements, are arrayed in an order in which the corresponding multilink information elements are arranged in the road management information list.

The coordinate information list may be referred to as an example of a real data list. This is because one information element of the coordinate information list is a coordinate or coordinate data regarded as a real data.

Further, a sub-link (also referred to as a segment) may be also defined as being in between two adjoining coordinate points, in between a starting end node and neighboring coordinate point, or in between a terminating end node and neighboring coordinate point. Furthermore, in this case, the coordinate information list may be also referred to as a sub-link information list; the coordinate list storage order may be referred to as a sub-link list storage order.

The road name ID list stores, in a plurality of predetermined fixed-lengths, offset information elements, each of which illustrates a road name's position in the name dictionary data, in a storage order identical to the multilink list storage order in which the corresponding road management information elements are arrayed in the road management information list (refer to FIG. 4). The road name information means information indicating a name of a road corresponding to a multilink. The road name ID list may be referred to as an example of a first offset information list.

The road number name ID list stores, in a plurality of predetermined fixed-lengths, offset information elements, each of which illustrates a road number's position in the name dictionary data, in a storage order identical to the multilink list storage order in which the corresponding road management information elements are arrayed in the road management information list (refer to FIG. 5). The road number information means information indicating a number of a road corresponding to a multilink. The road number name ID list may be referred to as an example of a second offset information list.

The name dictionary data is prepared as a dictionary of road names and road numbers while storing both of (i) road name information which indicates road name corresponding to a multilink and (ii) a road number corresponding to the multilink, in a storage order identical to the multilink list storage order in which the corresponding road management information elements are stored in the road management information list (refer to FIG. 4 (c) and FIG. 5 (c)). That is, the name dictionary data includes both of (i) information indicating the number of characters and (ii) variable-length data containing a character string.

In addition, the area code list stores, in a plurality of predetermined fixed lengths, area code information elements, each of which indicates a code number of an area corresponding to a multilink, in a storage order identical to the multilink list storage order in which the corresponding road management information elements are stored in the road management information list (refer to FIG. 6). The area code list may be referred to as an example of a real data list.

The address range information list stores, in a plurality of predetermined fixed lengths, address range information elements, each of which indicates a house number of a link, in a storage order identical to the link list storage order in which the corresponding link information elements are stored in the link information list (refer to FIG. 7). The address range information list may be referred to as an example of a real data list.

The representative coordinate information list stores, in a plurality of predetermined fixed lengths, representative coordinate information elements, each of which indicates a representative coordinate designated in a link, in a storage order identical to the link list storage order in which the corresponding link information elements are stored in the link information list (refer to FIG. 10). The representative coordinate information list may be referred to as an example of a real data list.

The higher level link ID list stores, in a plurality of predetermined fixed lengths, offset information elements, each of which indicates a position of a link of a higher level corresponding to the present link (of a lower level), in a storage order identical to the link list order in which the corresponding link information elements are stored in the link information list (refer to FIG. 8). The higher link ID list may be referred to as an example of a third offset information list.

The boundary node number list stores, in a plurality of predetermined fixed lengths, boundary node number information elements, each of which indicates whether or not a coordinate point is a boundary node that is designated in a boundary in between meshes of the map, in an order in which coordinate points being boundary nodes are designated in several links (refer to FIG. 9). The boundary node number list may be referred to as an example of a real data list.

The composite link restriction record list stores, in a plurality of predetermined fixed lengths, composite link restriction record information elements, each of which indicates a presence or absence of a composite link restriction record, in an order in which the corresponding link information elements are stored in the link information list (refer to FIG. 11). The composite link restriction record list may be referred to as an example of a real data list.

2. Explanation of Various Processes Using Map Data 1

The map data 1 of the present embodiment is recorded in a storage medium 100 such as a hard disk or a DVD, and is used for various processes such as a route retrieval process and a map drawing process by the navigation apparatus 60. In this case, the navigation apparatus 60 acquires a variety of information, such as road management information (road management information list), link information (link information list), and shape information (coordinate information list), from the map data 1 in the storage medium 100 via the map data input device 63. The various processes which use the map data 1 of the present embodiment are explained with reference to FIGS. 3 to 11. The navigation function, route retrieval process, and the map drawing process are well known; thus, the explanation is omitted.

(1) Acquisition of Road Management Information, Link Information, and Shape Information First, an example which acquires road management information, link information, and shape information (coordinate information) from the map data 1 of the present embodiment is explained with reference to FIG. 3. It is noted that FIG. 3 is a diagram for explaining the case of acquiring road management information, link information, and shape information from the map data 1 of the present embodiment.

First, the road management information list has information elements, each of which is arrayed in each unit of one multilink. In other words, one information element in one data field corresponds to one multilink. The control circuit 69 of the navigation apparatus 60 acquires the number of links contained in a single multilink from the map data 1 recorded on the storage medium 100 according to the present embodiment.

Then, the link information list has information elements, each of which is arrayed in a unit of one link. In other words, one information element in one data field corresponds to one link. The control circuit 69 acquires information elements by a numeral quantity of the number of links, which was acquired from the road management information list, to thereby know the links constituting the single multilink.

Then, the coordinate information list has information elements, each of which is arrayed in a unit of one coordinate point. In other words, one information element in one data field corresponds to one coordinate point. The control circuit 69 acquires information elements by a numeral quantity of the number of coordinate points, which was acquired from the link information list, to thereby know the shape of the link by using the coordinate points constituting the single link.

(2) Acquisition of Road Name

The following explains an example which acquires a road name from the map data 1 of the present embodiment with reference to FIG. 4. FIG. 4 is a diagram for explaining the case of acquiring a road name from the map data 1 according to the present embodiment.

As explained above, in the road management information list, roads or links having an identical road name is defined as a multilink; several multilinks are stored in a storage order (i.e., multilink list storage order). The storage order (i.e., the multilink list storage order) of the road management information list has one-to-one correspondence with a storage order (i.e., storage order of the information elements) of the road name ID list. The information element of the road name ID list indicates an offset (i.e., offset value) to the name dictionary data list. Thus, the control circuit 69 of the navigation apparatus 60 identifies in the road name ID list a road name ID corresponding to a multilink, based on the one-to-one correspondence in the storage orders of the road management information list and the road name ID list, from the map data 1 stored in the storage medium 100 via the map data input device 63. Thus, the control circuit 69 then acquires an offset information element in the identified road name ID in the road name ID list; then, the control circuit 69 identifies a position of a road name in the name dictionary data list based on the offset information element acquired from the road name ID list, thereby acquiring the road name.

(3) Acquisition of Road Number

The following explains an example which acquires a road number from the map data 1 of the present embodiment with reference to FIG. 5. FIG. 5 is a diagram for explaining the case of acquiring a road number from the map data 1 according to the present embodiment.

As explained above, in the road management information list, roads or links having an identical road name is defined as a multilink; several multilinks are stored in a storage order (i.e., multilink list storage order). The storage order (i.e., the multilink list storage order) of the road management information list has one-to-one correspondence with a storage order (i.e., storage order of the information elements) of the road number ID list. The information element of the road number ID list indicates an offset (i.e., offset value) to the name dictionary data list. Thus, the control circuit 69 of the navigation apparatus 60 identifies in the road number ID list a road number ID corresponding to a multilink, based on the one-to-one correspondence in the storage orders of the road management information list and the road number ID list, from the map data 1 stored in the storage medium 100 via the map data input device 63. Thus, the control circuit 69 then acquires an offset information element in the identified road number ID in the road number ID list; then, the control circuit 69 identifies a position of a road number in the name dictionary data list based on the offset information element acquired from the road number ID list, thereby acquiring the road number.

(4) Acquisition of Area Code

The following explains an example which acquires an area code from the map data 1 of the present embodiment with reference to FIG. 6. FIG. 6 is a diagram for explaining the case of acquiring an area code from the map data 1 according to the present embodiment.

As explained above, in the road management information list, roads or links having an identical road name is defined as a multilink; several multilinks are stored in a storage order (i.e., multilink list storage order). The storage order (i.e., the multilink list storage order) of the road management information list has one-to-one correspondence with a storage order (i.e., storage order of the information elements) of the area code list. Thus, the control circuit 69 of the navigation apparatus 60 identifies and acquires in the area code list an area code corresponding to a multilink, based on the one-to-one correspondence in the storage orders of the road management information list and the area code list, from the map data 1 stored in the storage medium 100 via the map data input device 63.

(5) Acquisition of Address Range Information

The following explains an example which acquires an address range information element from the map data 1 of the present embodiment with reference to FIG. 7. FIG. 7 is a diagram for explaining the case of acquiring an address range information element from the map data 1 according to the present embodiment.

As explained above, in the link information list, each information element corresponds to a link or a unit of a link; information elements are stored in a storage order (i.e., link list storage order). The storage order (i.e., the link list storage order) of the link information list has one-to-one correspondence with a storage order (i.e., storage order of the information elements) of the address range information list. Thus, the control circuit 69 of the navigation apparatus 60 identifies and acquires in the address range information list an address range information element corresponding to a link, based on the one-to-one correspondence in the storage orders of the link information list and the address range information list, from the map data 1 stored in the storage medium 100 via the map data input device 63.

(6) Acquisition of Higher Level Link ID

The following explains an example which acquires a higher level link ID from the map data 1 of the present embodiment with reference to FIG. 8. FIG. 8 is a diagram for explaining the case of acquiring a higher level link ID from the map data 1 according to the present embodiment. The explanation is made to an example to identify link information of level 1 (i.e., higher level mesh) from link information of level 0 (i.e., lower level mesh). In addition, as illustrated in NOTE in FIG. 8, a link ID (e.g., 100) in a higher level corresponds to a group of several link IDs (e.g., 10, 11, and 12) in a lower level.

As explained above, in the link information list, each information element corresponds to a link or a unit of a link; information elements are stored in a storage order (i.e., link list storage order). The storage order (i.e., the link list storage order) of the link information list has one-to-one correspondence with the storage order (i.e., storage order of the information elements) of the higher level link ID list of the lower level (i.e., level 0). The information element of the higher level link ID list indicates an offset (i.e., offset value) to a position of a higher level link in the link information list in the higher level (i.e., level 1). Thus, the control circuit 69 of the navigation apparatus 60 identifies in the higher level link ID list a higher level link ID corresponding to a present link, based on the one-to-one correspondence in the storage orders of the link information list and the higher level link ID list, from the map data 1 stored in the storage medium 100 via the map data input device 63. Thus, the control circuit 69 then acquires an offset information element in the identified higher level link ID in the higher level link ID list; then, the control circuit 69 identifies a position of a higher level link in the link information list of the higher level corresponding to the present link, based on the offset information element acquired from the higher level link ID list.

(7) Acquisition of Boundary Node Information

The following explains an example which acquires a boundary node information element from the map data 1 of the present embodiment with reference to FIG. 9. FIG. 9 is a diagram for explaining the case of acquiring a boundary node information element from the map data 1 according to the present embodiment. The boundary node may be referred to as an end node.

As explained in above (1), the control circuit 69 of the navigation apparatus 60 acquires the coordinate information (i.e., coordinate information element). The coordinate information element contains a flag, which is referred to when determining whether a coordinate point is a boundary node. The boundary node number list contains information elements corresponded to by boundary nodes in an order in which the corresponding boundary nodes are designated in the coordinate information list. When the coordinate point is determined to be a boundary node, the boundary node information element can be identified and acquired by referring to the boundary node number list.

(8) Acquisition of Representative Coordinate Information

The following explains an example which acquires a representative coordinate information element from the map data 1 of the present embodiment with reference to FIG. 10. FIG. 10 is a diagram for explaining the case of acquiring a representative coordinate information element from the map data 1 according to the present embodiment.

As explained above, in the link information list, each information element corresponds to a link or a unit of a link; information elements are stored in a storage order (i.e., link list storage order). The storage order (i.e., the link list storage order) of the link information list has one-to-one correspondence with a storage order (i.e., storage order of the information elements) of the representative coordinate information list. Thus, the control circuit 69 of the navigation apparatus 60 identifies and acquires in the address range information list a representative coordinate information element corresponding to a link, based on the one-to-one correspondence in the storage orders of the link information list and the representative coordinate information list, from the map data 1 stored in the storage medium 100 via the map data input device 63.

(9) Acquisition of Composite Link Restriction Information

The following explains an example which acquires a composite link restriction information element from the map data 1 of the present embodiment with reference to FIG. 11. FIG. 11 is a diagram for explaining the case of acquiring a composite link restriction information element from the map data 1 according to the present embodiment.

As explained in above (1), the control circuit 69 of the navigation apparatus 60 acquires the link information element. The link information element contains a flag, which is referred to when determining whether or not there is a composite link restriction designated in an end of the link. The composite link restriction information list contains information elements corresponded to by composite link restrictions in an order in which the composite link restrictions are designated in the link information list. When it is determined that there is a composite link restriction, the composite link restriction information element can be identified and acquired by referring to the composite link restriction information list.

3. Effect of First Embodiment

According to the map data 1 of the present embodiment, the following effects can be provided.

(1) The data for route retrieval and the data for map drawing can be made integrated one without independently separating them from each other.

(2) Storing data in data structure having an array in each of multiple layers allows an access to be improved.

(3) The data size of each data field or information element in the data structure or storage array is maintained fixed; the link information is provided not to contain a road name or the like to thereby allow the use of the link information as an index. Accesses into information elements can be achieved based on the order in the array (i.e., storage order) in the data structure.

(4) The road management information serving as multilink information is provided not to contain all the data; in contrast, the link information and the real data such as rode data 21 are prepared separately, in association with the road management information. It is thus unnecessary to sacrifice the data size of each information element or data field.

(5) The data structure can be prepared by using, of the links, the storage order which corresponds to a road configuration or actual arrangement order of the links.

(6) The connection relation with a higher level link is indicated by using relative storage array position (relative address or offset information). This enables a transfer from a link of any level to a link of a hierarchically higher level.

(7) As compared with a conventional map data, a higher level link ID information which indicates a higher level link ID can be removed. The higher level or higher layer for map drawing can be easily generated.

(8) For example, predetermined information such as an address range is unnecessary in the higher level or higher layer. The array for such data can be deleted; further, the deletion of such data is easy.

(9) All the layers can be provided to be an identical data format. That is, the data volume can be relatively small; the addition or deletion of data can be made easily. In addition, by providing the map data 1 which has the above feature, while the access speed is not sacrificed, the data for route retrieval and the data for map drawing can be integrated or unified.

The following explains, as an example, road drawing using the map data 1 according to the present embodiment. First, the number of links is acquired from the multilink information list; thereby, the links which constitute the multilink are acquired. Then, the number of coordinate points which constitute each link is acquired from the link information list. Furthermore, coordinate information elements corresponding to several coordinate points are traced by the links contained in the corresponding multilink in the coordinate information list, thereby enabling the drawing of the corresponding road. That is, each information element is consecutively arrayed, one by one; drawing of the road can be made at a high speed.

Aspects of Disclosure of First Embodiment

Aspects of the disclosure described herein are set out in the following clauses.

As an aspect of the disclosure, map data is provided as follows. In the map data, a road is presented in units of links and a multilink is defined as a plurality of links, which have an identical attribute and are consecutively arranged in an order in the multilink. The map data includes a multilink information list, a link information list, and a real data list. The multilink information list stores a plurality of multilink information elements in a plurality of predetermined fixed lengths, one multilink information element indicating a number of links arranged within one multilink, wherein the plurality of multilink information elements are arrayed in the multilink information list in an order that is defined as a multilink list storage order. The link information list stores a plurality of link information elements in a plurality of predetermined fixed lengths, one link information element indicating a number of coordinate points arranged within one link to illustrate a shape of the one link, wherein the plurality of link information elements are arrayed in the link information list in an order that is defined as a link list storage order. Herein, under the link list storage order, (i) a plurality of link information elements are respectively corresponded to by a plurality of links arranged in one multilink, the plurality of link information elements being arrayed in an order in which the corresponding links are consecutively arranged in the one multilink, wherein the plurality of link information elements with respect to the one multilink are respectively corresponded to by a multilink information element and defined as a link information element group with respect to one multilink, and (ii) a plurality of link information element groups are respectively corresponded to by a plurality of multilink link information elements, the plurality of link information element groups being arrayed in an order in which the corresponding multilink information elements are arrayed in the multilink information list. The real data list stores a plurality of real data elements, which are respectively corresponded to by a plurality of link information elements, wherein the plurality of real data elements are arrayed in an order in which the corresponding link information elements are arrayed in the link information list.

In more detail, in the above real data list, (i) several coordinates, which are respectively corresponded to by coordinate points, which are contained or arranged consecutively in one link, are arrayed in an order in which the corresponding coordinate points are arranged within the one link (i.e., in the coordinate point arrangement order within the one link), wherein the foregoing coordinates of coordinate points contained in one link are defined as a coordinate information element sub-group with respect to one link, (ii) several coordinate information element sub-groups, which are respectively corresponded to by several link information elements with respect to one multilink, are arranged in an order in which the corresponding link information elements are arrayed in the link information list (i.e., in the link arrangement order), wherein the foregoing coordinates contained or arranged consecutively in one multilink are defined as a coordinate information element group with respect to one multilink; and (iii) several coordinate information element groups, which are respectively corresponded to by several multilink information elements, are arrayed in an order in which the corresponding multilink information elements are arranged in the road management information list.

It is noted that above-mentioned real data may include the following several kinds: (a) coordinate information, (b) road name information, (c) road number information, (d) area code information, (e) address range information, (f) boundary node information, (g) representative coordinate information, and (h) composite link restriction information.

As an optional aspect of the map data, one real data element, which is relative to one link, in the real data list may include a plurality of data items; one data item may be a coordinate information item stored in a predetermined fixed length to indicate a coordinate of a coordinate point arranged in the one link to illustrate the shape of the one link; and a plurality of coordinate information items may be corresponded to by a plurality of coordinate points contained in the one link, the plurality of coordinate information items being arrayed in the real data list in an order in which the corresponding coordinate points are arranged in the one link.

As an optional aspect of the map data, one real data element, which is relative to one multilink, in the real data list may include a plurality of data items; and one data item may be a road name information item to indicate a name of a road corresponding to the one multilink. The map data may further include a road name offset information list storing, in a plurality of predetermined data lengths, a plurality of offset information items, each of which indicates a storage array position of the real data element in the real data list, the plurality of offset information items being corresponded to by a plurality of multilink information elements, the plurality of offset information items being arrayed in the road name offset information list in an order in which the corresponding multilink information elements are arrayed in the multilink information list.

As an optional aspect of the map data, one real data element, which is relative to one multilink, in the real data list may include a plurality of data items; and one data item is a road number information item to indicate a number of a road corresponding to the one multilink. The map data may further include a road number offset information list storing, in a plurality of predetermined data lengths, a plurality of offset information items, each of which indicates a storage array position of the real data element in the real data list, the plurality of offset information items being corresponded to by a plurality of multilink information elements, the plurality of offset information items being arrayed in the road number offset information list in an order in which the corresponding multilink information elements are arrayed in the multilink information list.

As an optional aspect of the map data, one real data element, which is relative to one multilink, in the real data list may include a plurality of data items; and one data item is provided in a predetermined data length, an area code information item to indicate a code number of an area corresponding to the one multilink.

As an optional aspect of the map data, one real data element, which is relative to one link, in the real data list may include a plurality of data items; and one data item may be provided in a predetermined data length, an address range information item to indicate a house number corresponding to the one link.

As an optional aspect of the map data, one real data element, which is relative to one link in one multilink, in the real data list may include a plurality of data items; one data item is a coordinate information item arrayed in a predetermined fixed length to correspond to a coordinate point arranged in the one link to illustrate the shape of the one link; a plurality of coordinate information items are corresponded to by a plurality of coordinate points contained in the one link, the plurality of coordinate information items being arrayed in the real data list in an order in which the corresponding coordinate points are arranged in the one link; and the coordinate information item indicating that corresponding coordinate point is a boundary node, which is located in a boundary of meshes constituting a map of the map data. The map data may further include a boundary node number list storing, in a plurality of predetermined data lengths, a plurality of boundary node numbers, the plurality of boundary node numbers being corresponded to by a plurality of coordinate information item corresponded to by nodes being boundary nodes, the plurality of boundary node numbers being arrayed in the boundary node number list in an order in which the corresponding coordinate points being boundary nodes are arrayed in the real data list.

As an optional aspect of the map data, one real data element, which is relative to one link, in the real data list may include a plurality of data items; and one data item may be a representative coordinate information item that is provided in a fixed data length to indicate a representative coordinate designated on the one link.

As an optional aspect of the map data, one real data element, which is relative to one link, in the real data list may include a plurality of data items; and one data item may be a composite link restriction information item that is provided in a fixed data length to indicate a presence or an absence of a restriction of a composite link with respect to the one link.

As an optional aspect of the map data, a higher layer link offset information list may be further included as storing, in a plurality of predetermined data lengths, a plurality of offset information items indicating, respectively, storage array positions of higher layer links corresponding to a plurality of links, which are corresponded to by link information elements. Herein, wherein the plurality of offset information items may be arrayed in the higher layer link offset information list in an order in which the corresponding link information elements are arrayed in the link information list.

Under the above configuration of the map data, advantages or effects described in the above mentioned [3. Effect of First Embodiment] can be provided.

Second Embodiment

In a second embodiment of the present invention, additional explanation will be made, in particular, in respect of acquisition of a higher level link ID from a link information list of a lower level to a link information list of a higher level via a higher level link ID list, with reference to FIG. 12. The same portions as those in the explanation according to the first embodiment are basically omitted; however, common primary portions are described again for easy understanding of the second embodiment. Such common portions are mainly related to FIG. 3.

1. Outline of Map Data 1

An outline of the map data 1 according to the present embodiment is the same as those of the first embodiment with reference to FIG. 1B and FIG. 2. Thus, the map data 1 according to the present embodiment has the same features as those described in (1) File structure, (2) Mesh structure, and (3) Integrated file structure in the first embodiment; thus, they are omitted from being explained below.

Herein, relating to (4) Road data 21 in the explanation of the first embodiment, the following description is similar to that of the first embodiment with a few additional comments, while dividing the explanation into two parts that relate FIG. 3 and FIG. 12, respectively as follows.

(1) Road Data 21 Relating to FIG. 3

The following is basically the same as that of the first embodiment. However, its characteristic may be a primary portion to be included in a characteristic of the second embodiment; thus, the explanation is made again.

As explained above, a multilink, which is also referred to as a link string, is defined as containing a group of links. Such links have an identical attribute (e.g., road name) while being physically and continuously connected to each other and arranged within the corresponding multilink consecutively in an order, which is referred to as a link arrangement order. Further, such links constituting one multilink may be assigned with link IDs having serial values. Furthermore, within one link, one or more interpolating shape points, if any, may be arranged within and along a corresponding link in an order, which is referred to as a shape point arrangement order, and defined so as to indicate a shape of the corresponding link using their coordinates. The shape point may be also referred to as a coordinate point, while the shape point arrangement order may be also referred to a coordinate point arrangement order.

On the basis of the foregoing relations among a multilink, links of the multilink, and coordinate points of each of the links, the following explanation can be made with respect to a road management information list, a link information list, and a coordinate information list.

Further, the links constituting one multilink may be referred to as a multilink-constituting link group; and the coordinate points constituting one link may be referred to as a link-constituting coordinate point group.

Now, with reference to FIG. 3 (a), (b), (c), each of three lists contains several data fields (e.g., ten data fields are illustrated in each list); each of the several data fields has a predetermined fixed length while containing or recording one information element.

First, with reference to FIG. 3 (a), the road management information list stores in array, in a plurality of predetermined fixed length data fields, several road management information elements. Each road management information element indicates the number of links contained in one multilink. The several road management information elements are arrayed in a storage order, which is referred to a multilink list storage order. Thus, the road management information list relates to several multilinks and is configured with respect to each of a unit of a multilink; in other words, each data field or information element corresponds to one multilink. Further, the road management information list may be also referred to as a multilink information list with respect to several multilinks.

Second, with reference to FIG. 3 (b), the link information list stores in array, in a plurality of predetermined fixed length data fields, several link information elements. Each link information element indicates the number of coordinate points, which are contained or arranged in one link in order to illustrate a shape of the one link. The number of coordinate points in the one link may be zero, one, or more than one. The several link information elements are arrayed in a storage order, which is referred to as a link list storage order. Thus, the link information list is configured with respect to each of a unit of a link; in other words, each data field or information element corresponds to one link.

Under the Above Link List Storage Order, (i) several link information elements, which are, respectively, corresponded to by several links contained in one multilink, are arrayed in an order in which the corresponding links are arranged within the one multilink (i.e., in the link arrangement order within the one multilink), wherein the foregoing several link information elements relative to the one multilink are defined as a link information element group with respect to one multilink, and (ii) several link information element groups, which are, respectively, corresponded to by several multilink information elements, are arrayed in an order in which the corresponding multilink information elements are arranged in the road management information list.

Third, with reference to FIG. 3 (c), the coordinate information list stores in array, in a plurality of predetermined fixed length data fields, several coordinate information elements. Each coordinate information element indicates coordinate information (e.g., a coordinate) of one coordinate point. The several coordinate information elements are arranged in a storage order, which is referred to as a coordinate list storage order. Thus, the coordinate information list is configured with respect to each of a unit of a coordinate point; in other words, each data field or information element corresponds to one coordinate point.

Under the Above Coordinate List Storage Order, (i) several coordinates, which are respectively corresponded to by coordinate points, which are contained or arranged consecutively in one link, are arrayed in an order in which the corresponding coordinate points are arranged within the one link (i.e., in the coordinate point arrangement order within the one link), wherein the foregoing coordinates of coordinate points contained in one link are defined as a coordinate information element sub-group with respect to one link, (ii) several coordinate information element sub-groups, which are respectively corresponded to by several link information elements with respect to one multilink, are arranged in an order in which the corresponding link information elements are arrayed in the link information list (i.e., in the link arrangement order), wherein the foregoing coordinates contained or arranged consecutively in one multilink are defined as a coordinate information element group with respect to one multilink; and (iii) several coordinate information element groups, which are respectively corresponded to by several multilink information elements, are arrayed in an order in which the corresponding multilink information elements are arranged in the road management information list.

The coordinate information list may be referred to as an example of a real data list. This is because one information element of the coordinate information list is a coordinate or coordinate data regarded as a real data.

Further, a sub-link (also referred to as a segment) may be also defined as being in between two adjoining coordinate points, in between a starting end node and neighboring coordinate point, or in between a terminating end node and neighboring coordinate point. Furthermore, in this case, the coordinate information list may be also referred to as a sub-link information list; the coordinate list storage order may be referred to as a sub-link list storage order.

(2) Road Data 21 Relating to FIG. 12

The following will be explained with respect to road data for acquisition of a higher level link ID from a link information list of a lower level to a link information list of a higher level via a higher level link ID list, with reference to FIG. 12.

FIG. 12 illustrates three lists of (a) a link information list of a lower level (also referred to as a lower level link information list), (b) a higher level link ID list, and (c) a link information list of a higher level (also referred to as a higher level link information list).

<<Lower Level Link Information List (see FIG. 12 (a))>>

The lower level link information list ((a) in FIG. 12) stores in array, in a plurality of predetermined fixed length data fields, several link information elements. Each link information element includes or indicates an ID of each of several links. The several link information elements are arrayed in a storage order, which is referred to as a lower level link list storage order. Thus, the lower level link information list is configured with respect to each of a unit of a link; in other words, each data field or information element corresponds to one link.

It is noted, that in the present embodiment, the lower level link information list ((a) in FIG. 12) is the same as the link information list in the first embodiment ((b) in FIG. 3); naturally, it need not be limited thereto.

<<Higher Level Link Information List (see FIG. 12 (c))>>

The higher level link information list ((c) in FIG. 12) stores in array, in a plurality of predetermined fixed length data fields, several multilink information elements (i.e., several link-string information elements). Herein, a multilink or a link string may be defined as a higher level link while a link may be defined as a lower level link. Each multilink information element includes or indicates an ID of each of several multilinks (i.e., an ID of each of several link strings). The several multilink information elements are arrayed in a storage order, which is referred to as a higher level link list storage order. Thus, the higher level link information list is configured with respect to each of a unit of a multilink or a link string; in other words, each data field or information element corresponds to one multilink or one link string.

It is noted, that in the present embodiment, the higher level link information list ((c) in FIG. 12) corresponds to the road management information list ((a) in FIG. 3) with respect to each of several multilinks. In other words, the above higher level link list storage order of the higher level link information list corresponds to the multilink list storage order of the road management information list ((a) in FIG. 3).

<<Higher Level Link ID list (see FIG. 12 (b))>>

The higher level link ID list ((b) in FIG. 12) stores, in a plurality of predetermined fixed lengths, offset information elements, each of which indicates a position in the higher level link information list ((c) in FIG. 12) with respect to a link of a higher level (i.e., multilink or link string) corresponding to the present link (of a lower level), in a storage order identical to the lower level link list storage order in which the corresponding lower level link information elements are stored in the lower level link information list ((a) in FIG. 12). The higher link ID list may be referred to as an example of an offset information list.

2. Explanation of Various Processes Using Map Data 1

Like in the first embodiment, the map data 1 of the present embodiment is recorded in the storage medium 100 and is used for various processes by the navigation apparatus 60. In this case, the navigation apparatus 60 acquires a variety of information from the map data 1 in the storage medium 100 via the map data input device 63. Two of the various processes which use the map data 1 of the present embodiment are explained with reference to FIG. 3 and FIG. 12.

(1) Acquisition of Road Management Information, Link Information, and Shape Information First, an example which acquires road management information, link information, and shape information (coordinate information) from the map data 1 of the present embodiment is explained with reference to FIG. 3. It is noted that FIG. 3 is a diagram for explaining the case of acquiring road management information, link information, and shape information from the map data 1 of the present embodiment.

First, the road management information list has information elements, each of which is arrayed in each unit of one multilink. In other words, one information element in one data field corresponds to one multilink. The control circuit 69 of the navigation apparatus 60 acquires the number of links contained in a single multilink from the the map data 1 recorded on the storage medium 100 according to the present embodiment.

Then, the link information list has information elements, each of which is arrayed in a unit of one link. In other words, one information element in one data field corresponds to one link. The control circuit 69 acquires information elements by a numeral quantity of the number of links, which was acquired from the road management information list, to thereby know the links constituting the single multilink.

Then, the coordinate information list has information elements, each of which is arrayed in a unit of one coordinate point. In other words, one information element in one data field corresponds to one coordinate point. The control circuit 69 acquires information elements by a numeral quantity of the number of coordinate points, which was acquired from the link information list, to thereby know the shape of the link by using the coordinate points constituting the single link.

(2) Acquisition of Higher Level Link ID or Multilink ID

The following explains an example which acquires a higher level link ID (i.e., a multilink ID) from the map data 1 of the present embodiment with reference to FIG. 12. FIG. 12 is a diagram for explaining the case of acquiring a higher level link ID from the map data 1 according to the present embodiment. The explanation is made to an example to identify link information of level 1 (i.e., higher level mesh) from link information of level 0 (i.e., lower level mesh). In addition, as illustrated in NOTE in FIG. 12, a link ID (e.g., 100) in a higher level corresponds to a group of several link IDs (e.g., 10, 11, and 12) in a lower level. It is noted that the link of level 0 or lower level may be referred to as a link whereas the link of level 1 or higher level may be referred to as a multilink or a link string, as explained in the above "(1) Road data 21 relating to FIG. 3."

Thus, in the lower level link information list, each information element corresponds to a link or a unit of a link; information elements are stored in a storage order (i.e., lower level link list storage order). The storage order (i.e., the link list storage order) of the lower level link information list has one-to-one correspondence with the storage order (i.e., storage order of the information elements) of the higher level link ID list of the lower level (i.e., level 0). The information element of the higher level link ID list indicates an offset (i.e., offset value) to a position of a higher level link in the higher level link information list in the higher level (i.e., level 1). Thus, the control circuit 69 of the navigation apparatus 60 identifies in the higher level link ID list a higher level link ID corresponding to a present link, based on the one-to-one correspondence in the storage orders of the lower level link information list and the higher level link ID list, from the map data 1 stored in the storage medium 100 via the map data input device 63. Thus, the control circuit 69 then acquires an offset information element in the identified higher level link ID in the higher level link ID list; then, the control circuit 69 identifies a position of a higher level link in the higher level link information list, the higher level link to which the present link belongs, based on the offset information element acquired from the higher level link ID list.

3. Effect of Second Embodiment

Under the above configuration according to the second embodiment, the same effect as those described in [3. Effect of First Embodiment] can be provided; furthermore, the following effect can be provided.

That is, the higher level link information list (i.e., the link information of a higher level road network) is provided as corresponding to the lower level link information list (i.e., the link information of a lower level road network; thus, the link of the higher level layer and the link of the lower level layer are associated with each other using the offset information.

In the route retrieval using the above map data, a route calculation can be made in the road network of the higher level layer based on the link numbers of the road network of the higher level layer.

That is, there is no need of reciprocal transfers between the higher level layer and the lower level layer when the route retrieval is made from the link of the higher level layer; thereby, the route calculation can be made within the higher level layer. Needless to say, there is no need to find a higher level connection node like in the case of using a conventional map data. That is, unlike a conventional map data, the map data according to the present embodiment has a configuration that does not include any connection node. Thus, a high speed route retrieval can be achieved.

It will be obvious to those skilled in the art that various changes may be made in the above-described embodiments of the present invention. However, the scope of the present invention should be determined by the following claims.

What is claimed:

1. A non-transitory computer readable medium having stored therein map data, in which a road is presented in units of links and a multilink is defined as a plurality of links, which have an identical attribute and are consecutively arranged in an order in the multilink, the map data comprising:
a multilink information list that stores a plurality of multilink information elements in a plurality of predetermined fixed lengths, one multilink information element indicating a number of links arranged within one multilink, wherein the plurality of multilink information elements are arrayed in the multilink information list in an order that is defined as a multilink list storage order;
a lower level link information list that stores a plurality of lower level link information elements in a plurality of predetermined fixed lengths, one link information element indicating a number of coordinate points arranged within one link to illustrate a shape of the one link, wherein the plurality of lower level link information elements are arrayed in the lower level link information list in an order that is defined as a lower level link list storage order,
wherein under the lower level link list storage order,
(i) a plurality of lower level link information elements are respectively corresponded to by a plurality of links arranged in one multilink, the plurality of lower level link information elements being arrayed in an order in which the corresponding links are consecutively arranged in the one multilink, wherein the plurality of lower level link information elements with respect to the one multilink are respectively corresponded to by a multilink information element and defined as a link information element group with respect to one multilink, and
(ii) a plurality of link information element groups are respectively corresponded to by a plurality of multilink link information elements, the plurality of link information element groups being arrayed in an order in which the corresponding multilink information elements are arrayed in the multilink information list;
a higher level link information list that stores a plurality of higher level link information elements in a plurality of predetermined fixed lengths, one higher level link information element indicating a multilink as a higher level link, wherein the plurality of higher level link information elements are arrayed in the higher level link information list in an order that is defined as a higher level link list storage order; and
a higher level link offset information list that stores, in a plurality of predetermined data lengths, a plurality of offset information items each of which indicates a storage array position in the higher level list information list with respect to a multilink as a higher level link corresponding to a plurality of links, which are corresponded to by lower level link information elements,
wherein the plurality of offset information items are arrayed in the higher level link offset information list in an order in which the corresponding lower level link information elements are arrayed in the lower level link information list.

2. The non-transitory computer readable medium having stored therein map data according to claim 1, further comprising:
a coordinate information list that stores a plurality of coordinate information items in a plurality of predetermined data lengths, one coordinate information item indicating a coordinate of a coordinate point arranged in one link to illustrate the shape of the one link, wherein the plurality of coordinate information items are corresponded to by a plurality of coordinate points contained in the one link, the plurality of coordinate information items being arrayed in the coordinate information list in an order in which the corresponding coordinate points are arranged in the one link.

3. A method for preparing map data used in a navigation apparatus in a vehicle, the map data in which a road is presented in units of links and a multilink is defined as a plurality of links, which have an identical attribute and consecutively arranged in an order in the multilink, the method comprising performing by a computer each of the following steps:
preparing a multilink information list storing a plurality of multilink information elements in a plurality of predetermined fixed lengths, one multilink information element indicating a number of links arranged within one multilink, wherein the plurality of multilink information elements are arrayed in the multilink information list in an order that is defined as a multilink list storage order;

preparing a link information list storing a plurality of link information elements in a plurality of predetermined fixed lengths, one link information element indicating a number of coordinate points arranged within one link to illustrate a shape of the one link, wherein the plurality of link information elements are arrayed in the link information list in an order that is defined as a link list storage order, wherein under the link list storage order,
(i) a plurality of link information elements are respectively corresponded to by a plurality of links arranged in one multilink, the plurality of link information elements being arrayed in an order in which the corresponding links are consecutively arranged in the one multilink, wherein the plurality of link information elements with respect to the one multilink are respectively corresponded to by a multilink information element and defined as a link information element group with respect to one multilink, and
(ii) a plurality of link information element groups are respectively corresponded to by a plurality of multilink link information elements, the plurality of link information element groups being arrayed in an order in which the corresponding multilink information elements are arrayed in the multilink information list;

preparing a higher level link information list that stores a plurality of higher level link information elements in a plurality of predetermined fixed lengths, one higher level link information element indicating a multilink as a higher level link, wherein the plurality of higher level link information elements are arrayed in the higher level link information list in an order that is defined as a higher level link list storage order; and preparing a higher level link offset information list that stores, in a plurality of predetermined data lengths, a plurality of offset information items each of which indicates a storage array position in the higher level list information list with respect to a multilink as a higher level link corresponding to a plurality of links, which are corresponded to by lower level link information elements, wherein the plurality of offset information items are arrayed in the higher level link offset information list in an order in which the corresponding lower level link information elements are arrayed in the lower level link information list.

4. A data product stored in a non-transitory computer-readable storage medium, the data product comprising the map data according to claim 1.

5. A non-transitory computer-readable storage medium storing map data prepared by the method according to claim 3.

6. A navigation apparatus in a vehicle, the navigation apparatus comprising:
- a map data storage device to store map data prepared by the method according to claim 3;
- a position detection device to detect a present position of the vehicle;
- an input device to receive an instruction input by the user;
- a notification device to notify a user in the vehicle of navigational information; and
- a control circuit to retrieve a guide route based on a present position detected by the present position and a destination designated by an instruction input via the input device.

* * * * *